United States Patent
Marino et al.

(10) Patent No.: US 10,594,508 B2
(45) Date of Patent: Mar. 17, 2020

(54) HDMI SMART SWITCH

(71) Applicant: Caavo Inc, Santa Clara, CA (US)

(72) Inventors: Nino Vincenzo Marino, Alameda, CA (US); Sharath Hariharpur Satheesh, Bangalore (IN); Ashish Dharmpal Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 184 days.

(21) Appl. No.: 15/474,740

(22) Filed: Mar. 30, 2017

(65) Prior Publication Data

US 2017/0288894 A1 Oct. 5, 2017

Related U.S. Application Data

(60) Provisional application No. 62/317,399, filed on Apr. 1, 2016.

(51) Int. Cl.
*H04L 12/28* (2006.01)

(52) U.S. Cl.
CPC .......... *H04L 12/283* (2013.01); *H04L 12/282* (2013.01); *H04L 12/2809* (2013.01); *H04L 2012/2849* (2013.01)

(58) Field of Classification Search
CPC .......................... H04L 12/283; H04L 12/2809
See application file for complete search history.

(56) References Cited

U.S. PATENT DOCUMENTS

| | | | |
|---|---|---|---|
| 8,260,975 B1 | 9/2012 | Schanin et al. | |
| 2012/0069246 A1* | 3/2012 | Thornberry | G08B 15/002 348/730 |
| 2014/0222862 A1* | 8/2014 | Arling | G06F 17/30477 707/769 |

* cited by examiner

*Primary Examiner* — Zhensheng Zhang
(74) *Attorney, Agent, or Firm* — Fiala & Weaver P.L.L.C.

(57) ABSTRACT

Methods, systems and apparatuses are described for intelligent device integration. A device (e.g., an HDMI "smart" switch) with multiple communication interfaces (e.g., HDMI, LAN, BT, IR) may monitor communications for control signals from multiple controllers configured to control respective devices (e.g., HDMI source, sink and/or switch devices). A device LAN may couple HDMI source and sink devices and non-HDMI devices. LAN communications may be monitored for device and control information. Control signals from controllers may be used to control devices that the controllers and their control signals are not configured to control. Interpreted control decisions may be based on, for example, an interpreted control in the context of a detected configuration and/or state of devices. A device may, thereby, expand the utility of incompatible controllers (without reprogramming), integrate an environment of incompatible devices and controllers, and provide relief to end-users.

20 Claims, 4 Drawing Sheets

HDMI SMART SWITCH

CROSS REFERENCE TO RELATED APPLICATIONS

This application claims priority to U.S. Provisional Patent Application No. 62/317,399, filed on Apr. 1, 2016, and entitled "HDMI SMART SWITCH WITH NETWORK GATEWAY OR ACCESS POINT FUNCTIONALITY," the entirety of which is incorporated by reference.

BACKGROUND

Technical Field

The subject matter described herein relates to high-definition multimedia interface (HDMI) devices.

Description of Related Art

As the number of connected electronic devices increases, the complexity of controlling the devices increases. For example, a home entertainment system may connect many devices. The devices may be controlled by a variety of controls with a variety of communication protocols using a variety of signal types, such as Infrared (IR), Bluetooth (BT), wired or wireless Internet Protocol (IP), high-definition multimedia interface (HDMI), and/or other wireless or wired connections (e.g., a power line). IP control signals may be used to control a device (e.g., a video game console) and/or an application running thereon (e.g., to playback a video game or movie). In an example, a software application on a smart phone may cause the phone to send IP communications (e.g., control signals) to control a device. In an "open system" of interconnected devices, other devices (e.g., televisions) may be oblivious to communications for some or all other connected devices. In an open system, a user may have to perform multiple operations to complete a single task. For example, a user may have to use a smart phone application to launch an application on a video game console and also use a TV (television) remote control to turn on a TV for a single intended purpose to interact with the video game console using the TV.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and apparatuses are described for intelligent management and integration of devices and systems. A device (e.g., an HDMI "smart" switch) with multiple wired and/or wireless communication interfaces (e.g., HDMI, LAN (local area network), BT, IR) may monitor communications for control signals from multiple controllers (e.g., device remote, game controller, computer or phone application) configured to control respective devices (e.g., HDMI source, sink and/or switch devices). The device may include or access a network gateway (GW) or access point (AP). A LAN may couple HDMI source and sink devices and non-HDMI devices. The device may interpret and learn from monitored communications. LAN communications may be monitored for device and control information. Control signals from controllers may be used to control devices that the controllers and their control signals are not configured to control. Interpreted control decisions may be based on, for example, an interpreted control in the context of a detected configuration and/or state of devices. The device may, thereby, expand the utility of incompatible controllers (without reprogramming), integrate an environment of incompatible devices and controllers and relieve end-users from the burden of having to find the right controller for the right device, or buying, programming and learning to use expensive programmable controllers to replace multiple controllers.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
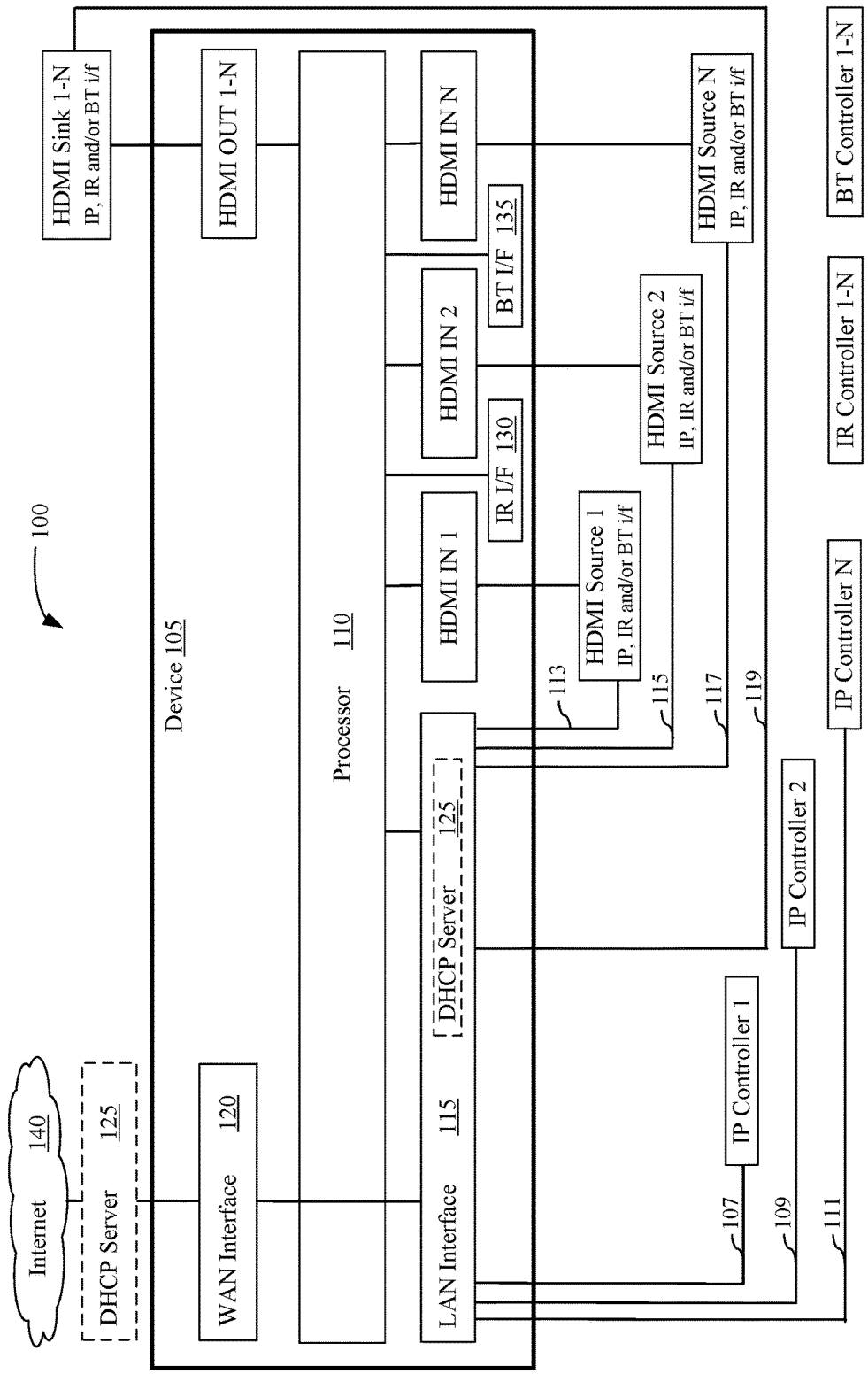
FIG. 1 shows a block diagram of an example system configured to provide system integration by interpreting control signals to control devices that the control signals do not control, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

The term embodiment is defined as a non-limiting example among many possible examples in the spirit and scope of this disclosure. An example may be a described and/or implemented example. An example (e.g., embodiment) herein may indicate a particular feature, structure, characteristic, procedure, etc. Other examples may be implemented with none, one or more (e.g., all) of the features, structures, characteristics, procedures, etc. that may be utilized in one or more other examples with or without the same configuration in other examples (e.g., implementations). This disclosure is written in view of one of ordinary skill in the art with knowledge and skill to implement features, structures, characteristics, procedures, etc. in disclosed examples as well as in other examples not disclosed herein. Although examples may be described relative to HDMI-CEC (Consumer Electronics Control), they and/or other examples may be implemented for other communication protocols.

A source device is defined as a device that sends a signal (e.g., an AV (audio-video signal) to a sink device. Examples of HDMI source devices include an HDMI DVD (digital video disc) player and an HDMI set-top box.

A sink device is defined as a device that receives a signal (e.g., an AV signal) from a sink device. An example of an HDMI sink device is an HDMI TV (HDTV (high definition television)).

A repeater (e.g., transceiver) is defined as a device that sends (e.g., sources) and receives (e.g., sinks) signals. Examples of an HDMI repeater include an HDMI A/V receiver or HDMI switch.

HDMI-CEC is a communication channel (e.g., serial bus with an associated communication protocol) that may be present in an HDMI cable. HDMI-CEC may be implemented, for example, as a single-wire interface. HDMI devices may be coupled to (e.g., connected to or hung on) a CEC interface, creating a chain of HDMI devices. A CEC channel (e.g., path or line) may carry messages defined by an HDMI-CEC specification, which may enable HDMI devices to communicate with each other. A CEC line may permit command and control of CEC-enabled devices (e.g., AV receiver, TV, set-top box, smart HDMI cable circuitry) connected through HDMI, for example, by one or more remote controls and/or by one or more CEC-enabled devices.

N is used to refer to any number of devices, e.g., for simplified drawings referencing a wide variety of examples. The number N for any group of devices may or may not be the same number for any other group of devices.

II. Example Embodiments

According to embodiments, a device (e.g., an HDMI switch) with multiple wired and/or wireless communication interfaces (e.g., HDMI, LAN, BT, IR) may monitor communications for control signals from multiple controllers (e.g., device remote, game controller, computer or phone application) configured to control respective devices (e.g., HDMI source, sink and/or switch devices). A device LAN may couple HDMI source and sink devices and non-HDMI devices. A device may interpret and learn from monitored communications. LAN communications may be monitored for device and control information. Control signals from controllers may be used to control devices that the controllers and their control signals are not configured to control. Interpreted control decisions may be based on, for example, an interpreted control in the context of a detected configuration and/or state of devices. A device may, thereby, expand the utility of incompatible controllers (without reprogramming), integrate an environment of incompatible devices and controllers, and relieve end-users from the burden of having to find the right controller for the right device, or buying, programming and learning to use expensive programmable controllers to replace multiple controllers.

In an example, a device may be configured to (i) receive a plurality of communications from a plurality of controllers over a first communication interface (e.g., a LAN)), (ii) interpret and use control information in the communications to control a plurality of devices coupled to a second communication interface (e.g., HDMI) that the communications are not configured to control, and (iii) interpret and use control information in the communications to control the device, which the plurality of communications are not configured to control.

In an example, a multi-interface device (e.g., HDMI switch) may comprise a first communication interface (e.g., HDMI) for communication of first protocol messages (e.g., HDMI-CEC), a second communication interface (e.g., LAN) for communication of second protocol messages (e.g., IP), and a controller configured to determine one or more controls for the first communication interface (e.g., control active source input) and/or a first device (e.g., compose and send IP or HDMI message to control source and/or sink device) coupled to the first communication interface based on a second protocol message (e.g., network communication) that is not configured to control the first communication interface and the first device. The multi-interface device may further comprise a third communication interface (e.g., IR or BT) for communication of third protocol messages, where the controller may determine one or more controls for at least one of the first communication interface and a first device coupled to the first communication interface based on a third protocol message (e.g., IR or BT) that is not configured to control the first communication interface and the first device.

The multi-interface device may couple a plurality of HDMI devices (e.g., source and sink devices) and a plurality of non-HDMI devices to a LAN interface. In an example, AN Apple TV HDMI output may be coupled to an HDMI interface of the multi-interface device and Apple TV WiFi may be coupled to a LAN interface of the multi-interface device. The multi-interface device may obtain device and control information by monitoring IP messages between a LAN interface and a WAN interface. The multi-interface device controller may learn control signals, for example, by (i) acquiring a control device's messaging protocol, (ii) observing and linking sequences of control operations, and/or (iii) requesting actions and observing responses.

The multi-interface device may enable a remote control device or application to operate a plurality of devices that the remote control (or application) is incompatible with (including using an entirely different communication type or protocol) by interpreting a control message received from the remote control and translating or mapping the control message to control operations compatible with the plurality of devices. Based on interpretation, and given a configuration of devices, one control message may lead to the generation of multiple control signals (e.g., a sequence of controls) to effect what appears to be the intent of a device or user.

In an example method of operation, a first communication interface may be provided for a first communication protocol. A second communication interface may be provided for a second communication protocol. Information about devices and control messages may be acquired (e.g., by downloading, a training procedure, or a learning procedure). Communications may be monitored over the first and second communication interface for information. Devices and control messages may be identified in the monitored information (e.g., to accumulate reference information and/or to take action(s)). A second protocol message may be received through the second communication interface. Devices and control messages may be identified in the received message. The control message may be interpreted (e.g., using reference information). A determination may be made (e.g., based on the interpretation) whether to take one or more actions to control one or more devices that are not configured to be controlled by the second protocol message. One or more devices that are not configured to be controlled by the second protocol message may be controlled based on the interpretation, such as by controlling one or more of a device providing the first communication interface and a device coupled to the first communication interface. For example, controlling may comprise translating or mapping a received IP communication to one or more control signals or messages configured to control at least one of an HDMI switch, an HDMI source device and an HDMI sink device that are not configured to be controlled by the received IP communication.

Embodiments may be configured in various ways to perform such operations. For instance, FIG. 1 shows a block diagram of a system 100 configured to provide system integration by interpreting control signals to control devices that the control signals do not control. System 100 is described as follows.

As shown in FIG. 1, system 100 includes a first device (e.g., HDMI switch) 105, HDMI Sink 1-N, HDMI Source 1, HDMI Source 2 . . . HDMI Source N, IP Controller 1, IP controller 2 . . . IP Controller N, an IR Controller 1-N, and a BT Controller 1-N. System 100 may be, for example, a home entertainment system including a variety of devices, each with their own controller. Device types, device manufacturers, device interfaces, device communication types, device communication protocols, device remote controls, etc. may vary among devices. System 100 is one of many possible examples of a system.

HDMI Source 1-N may represent N source devices, where N is any integer. An HDMI source device may be, for example, a Blu-ray player, a set-top box (e.g., cable or satellite set-top box), a video game console, a DVD player, a computer (e.g., desktop, notebook, tablet), a streaming media device, etc. Each source device HDMI Source 1-N may be controlled by one or more controllers, which may be wired or wireless (e.g., wireless remote controls). Each HDMI source device of HDMI Source 1-N may have IP, IR and/or BT interfaces in addition to HDMI interfaces.

HDMI Sink 1-N may represent N sink devices, where N may be any number. A sink device may be, for example, an HDMI TV, a computer or monitor, a projector, a receiver, etc. Each sink device HDMI Sink 1-N may be controlled by one or more controllers, which may be wired or wireless (e.g., wireless remote controls). Each HDMI sink device of HDMI Sink 1-N may have IP, IR and/or BT interfaces in addition to HDMI interfaces.

System 100 may comprise a plurality of controllers. A controller may control one or more devices in system 100. Control devices may include, for example, a game controller, mobile phone such as a smart phone, a personal data assistant (PDA), a tablet, a laptop, a personal computer, etc. A control device may include software (e.g., an application such as a mobile/phone application or a computer application) that controls or uses features of the device to communicate control messages or commands. A controller may be, for example, a remote control provided by a manufacturer with an HDMI device, an aftermarket (e.g., third party) remote control, etc. A controller may be a dedicated control device or a general purpose device with a control feature (e.g., a control application running on a desktop, notebook, tablet or phone).

Infrared (IR) Controller 1-N represents N IR controllers (e.g., remote controls), where N may be any number. One or more source devices of HDMI Source 1-N, one or more sink devices of Sink Device 1-N, and/or device 105 may be provided (e.g., by a manufacturer) with a respective controller, which may be an IR controller. Each IR controller may control one or more devices. An IR controller may not be configured to control one or more devices in system 100, e.g., due to a device not having an IR interface or due to use of a different communication protocol (e.g., a different communication format or set of commands).

Bluetooth (BT) Controller 1-N represents N BT controllers (e.g., remote controls), where N may be any number. One or more source devices of HDMI Source 1-N, one or more sink devices of Sink Device 1-N, and/or device 105 may be provided (e.g., by a manufacturer) with a respective controller, which may be a BT controller. Each BT controller may control one or more devices. A BT controller may not be configured to control one or more devices in system 100, e.g., due to a device not having a BT interface or due to use of a different communication protocol (e.g., a different communication format or set of commands).

IP Controller 1-N represents N IP controllers (e.g., remote controls), where N may be any number. One or more source devices of HDMI Source 1-N, one or more sink devices of Sink Device 1-N, and/or device 105 may be provided (e.g., by a manufacturer) with a respective controller, which may be an IP controller. Each IP controller may transmit commands to control one or more devices. An IP controller may not be configured to control one or more devices, for example, due to a device not having an IP interface or due to use of a different communication protocol (e.g., a different communication format or set of commands). In an example, an IP controller may be a dedicated control (e.g., remote control) or general purpose control device (e.g., computer or phone) executing a software application (e.g., SmartGlass) that causes the device to transmit control commands in IP communications.

Device 105 may have multiple interfaces, such as HDMI interface ports HDMI IN 1-N and HDMI OUT 1-N, LAN Interface 115, IR Interface 130, BT Interface 135 and WAN interface 120. Device 105 in this and other examples may have any type and number of interfaces. As indicated in FIG. 1, HDMI devices (e.g., HDMI Source 1-N, HDMI Sink 1-N) may have IP, IR and/or BT interfaces in addition to HDMI interfaces. Whichever interface(s) a device has, the interface(s) may be used for communication, which may include receiving control signals from one or more controllers, e.g., IP Controller 1-N, IR Controller 1-N, BT Controller 1-N and/or HDMI (e.g., HDMI-CEC).

HDMI interface HDMI IN 1, HDMI IN 2 . . . HDMI IN N and HDMI OUT 1-N may be coupled by respective HDMI cables to HDMI Source 1, HDMI Source 2 . . . HDMI Source N and HDMI OUT 1-N. HDMI cables may comprise a communication channel (e.g., HDMI-CEC) that participating HDMI devices may use to communicate with each other. HDMI communications may be detected and interpreted or issued by device 105.

IR interface 130 may be used for IR communications for device 105 and/or to detect IR communications that may not be intended for device 105. Each IR controller of IR Controller 1-N may be coupled by wireless communication with IR interface 130 and/or one or more IR interfaces of HDMI Source 1-N and/or HDMI Sink 1-N. An IR controller may provide commands to its associated device(s) and these commands may be detected by IR Interface 130 and interpreted by device 105.

BT interface 135 may be used for BT communications for device 105 and/or to detect BT communications that may not be intended for device 105. Each BT controller of BT Controller 1-N may be coupled by wireless communication with BT interface 135 and/or one or more BT interfaces on HDMI Source 1-N and/or HDMI Sink 1-N. A BT controller may provide commands to its associated device and these commands may be detected by BT Interface 135 and interpreted by device 105.

LAN interface 115 may provide wired (e.g., Ethernet) and/or wireless (e.g., WiFi access point) IP connections to any number of devices with appropriate interfaces (e.g., HDMI devices of HDMI Source 1-N and/or HDMI Sink 1-N, non-HDMI devices, IP Controller 1-N). For example, IP Controllers 1-N may be coupled by wired or wireless connections 107, 109, 111, respectively, to LAN interface 115. HDMI Source 1-N may be coupled by wired or wireless connections 113, 115, 117, respectively, to LAN interface 115. HDMI Sink 1-N may be coupled by wired or wireless connection(s) 119, respectively, to LAN interface 115.

An IP interface (e.g., LAN interface) in any one or more of IP Controller 1-N, HDMI Source 1-N and HDMI Sink 1-N may be wired (e.g., WiFi) or wireless (e.g., Ethernet). Devices (e.g., source, sink, switch, controller devices) that may have an IP interface for IP communication (e.g., control commands) may comprise, for example, an A/V receiver, desktop computer, notebook computer, tablet computer, video-game console, smartphone, digital camera, digital versatile disc (DVD) player, Blu-ray Disc (BD) player, digital audio player, other home theater components, etc.

WAN interface 120 may comprise one or more wired or wireless interfaces that may be configured to be coupled to a device (e.g., router, modem) through which device 105 may be coupled to a wide area network such as the Internet 140. WAN interface 120 may be coupled to LAN interface 115, which may enable devices coupled to LAN interface 115 to be connected to a WAN (e.g., Internet 140). IP traffic (e.g., packets, frames, messages) originating from devices coupled to device 105 may flow into and through device 105.

WAN interface 120 and LAN interface 115 may permit device 105 to function as a network gateway (e.g., network router), a wireless network access point, and/or a wired network switch. In an example, device 105 may be configured to be a network gateway/router. Device 105 may comprise a Dynamic Host Configuration Protocol (DHCP) server 125 and other network routing functionality. In an example, Device 105 may (e.g. alternatively) be configured as a network switch (NS) or access point (AP). Devices coupled to device 105 may obtain an IP address from a device (e.g. an external device) with a DHCP server coupled to WAN interface 120.

Device 105 may be a discrete or integrated device (e.g., part of another device such as an HDMI switch or HDMI repeater). Device 105 may (e.g., in addition to other tasks such as providing an HDMI switch for HDMI source and sink devices) be configured to provide system integration for devices in system 100, such as device 105, HDMI source devices of HDMI Source 1-N, HDMI sink devices of HDMI Sink 1-N, IR Controller 1-N, BT Controller 1-N and IP Controller 1-N. Device 105 may integrate devices in system 100, for example, by interpreting control signals for particular devices (e.g., received over one or more interfaces) to determine whether to control other devices (e.g., over one or more interfaces), to determine what devices to control (e.g., including itself), and to determine how to control devices based on detected incompatible control signals (e.g., turn ON, turn OFF, pause, play, FF, rewind, switch port, volume up, volume down). For example, device 105 may operate one or more algorithms that attempt to discern and carry out user/operator intent based on one or more of a detected command, a state of devices and/or a learned history of commands. Device 105 may comprise logic implemented in hardware or hardware and software, for example, with or without firmware. Device 105 may comprise, for example, a processor, microprocessor, controller, system-on-a-chip (SoC), etc.

Processor 110 (e.g., logic of any kind) may comprise one or more modules, submodules, components, subcomponents, etc. that perform one or more tasks pertaining to integration of incompatible devices or communications in system 100, communication monitoring, device identification, message identification, message interpretation, control of device 105 (e.g., switch control), control (e.g., messages) for other devices (e.g., source and/or sink devices), learning devices, pairing and commands, storing and referencing learned information.

Processor 110 may have access to communications through one or more interfaces (e.g., LAN interface 115, WAN interface 120, HDMI interface HDMI IN 1-N and HDMI Out 1-N, IR interface 130 and/or BT interface 135). In an example, there may be an IP subnetwork (subnet) between LAN interface 115 and processor 110. Processor 110 may have access to communications over an IP bridge between LAN interface 115 and WAN interface 120. Processor 110 may have access to all information (e.g., at a network level) flowing in and out of every network enabled device coupled to LAN interface 115. This may permit device identification, device control recognition, and device control that an HDMI device (e.g., HDMI switch) may otherwise be unaware of. Information may be used to improve user experience with a system of otherwise incompatible devices and controls.

Processor 110 may, for example, receive all IP traffic from network enabled devices (e.g., IP Controller 1-N, HDMI Source 1-N and HDMI Sink 1-N). Processor 110 may process IP traffic to identify devices coupled to device 105, identify one or more messages (e.g., control messages) communicated between two or more network enabled devices, and interpret the identified messages to determine appropriate control (if any) of one or more devices in system 105.

Figure 2:
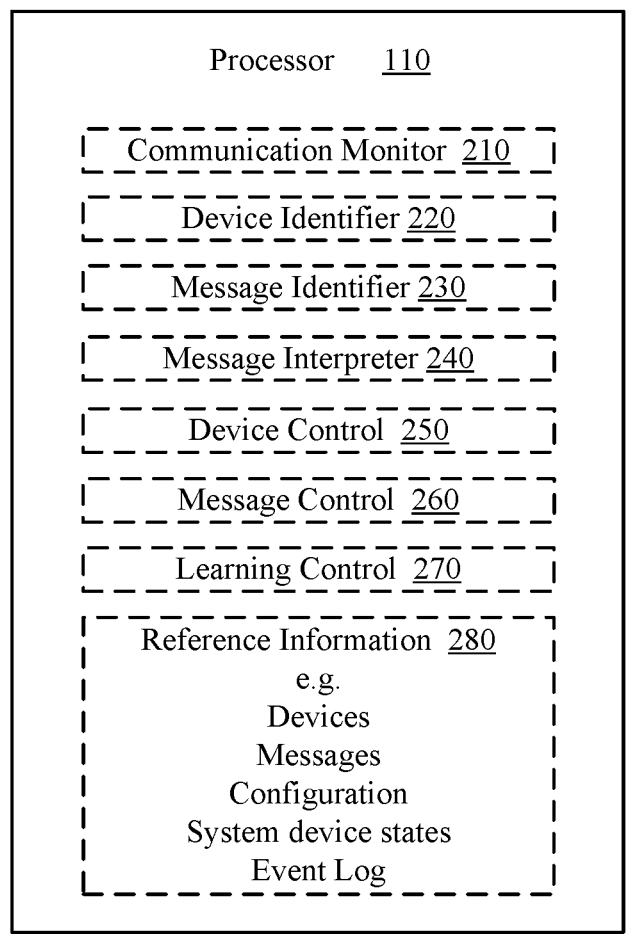
FIG. 2 is show a block diagram of an example processor configured to provide system integration by interpreting control signals to control devices that the control signals do not control, according to an embodiment.

FIG. 2 shows a block diagram of an example of processor that may be configured to provide system integration by interpreting control signals to control devices that the control signals do not control (e.g., incompatible devices). In particular, FIG. 2 shows example components in processor 110 (of FIG. 1), according to an embodiment. Other examples may implement the same or different, more or fewer components with or without subcomponents.

In an example, processor 105 may comprise one or more of a communication monitor 210, a device identifier 220, a message identifier 230, a message interpreter 240, a device control 250, a message control 260, a learning control 270 and reference information 280. Processor 105 (e.g., as it may be implemented in a wide variety of examples) may comprise additional or alternative components, modules, etc. These components of processor 105 are described in further detail as follows.

Communication monitor 210 may, for example, monitor communications sent to or received by one or more devices in system 100 via one or more interfaces (e.g., LAN, WAN, HDMI, IR, BT). For example, communication monitor 210 may monitor and collect or store information in messages, such as IP messages communicated over LAN interface 115 or WAN interface 120, HDMI-CEC messages communicated over HDMI interface ports HDMI In 1-N and HDMI Out 1-N, IR messages detected via IR interface 130 (e.g., regardless of whether device 105 or another device is a sender or intended recipient), BT messages detected via BT interface 135 (e.g., regardless of whether device 105 or another device is a sender or intended recipient) and/or other messages.

Device identifier 220 may, for example, identify devices (e.g., sending and receiving devices) based on information monitored or collected by communication monitor 210 and/or based on other information. In an example, device identifier 220 may identify or track media access control (MAC) addresses and IP addresses of devices in system 100 that may be network enabled or may be coupled to an IP interface of device 105. Device identifier 220 may, by tracking devices, determine the number and identity of network devices. For example, device identifier 220 may identify a particular device coupled to device 105 based on MAC addresses that comprise one or more known octets that may be indicative of a particular device brand, model and/or type. Examples of such octets may be published and may be accessible at known locations on the Internet. In an (e.g., another) example, device identifier 220 may identify a particular device, for example, by determining whether a message transmitted by a particular device (e.g., using a network protocol such as Digital Living Network Alliance (DLNA), Simple Service Discovery Protocol (SSDP), multicast DNS (mDNS), etc.) includes certain information, such as a device name. Device identifier 220 may (e.g., also) identify non-network enabled devices in system 100, for example, based on information monitored or collected by communication monitor 210 from non-IP messages (e.g., HDMI-CEC messages, IR messages and/or BT messages). Device identifier 220 may identify devices in system 100 based on information (e.g., for network enabled and/or non-network enabled devices) other than information collected by communication monitor 210. For example, a device and/or a user (e.g., using a device) may provide input (e.g., a response to inquiry) specifying a device coupled to device 105. Identified device information may be accumulated, for example, in reference information 280.

Message identifier 230 may identify and may collect or store messages (e.g., commands from/to sending/receiving devices) in communication information monitored or collected by communication monitor 210. Message identifier 230 may identify messages (e.g., commands) that may be issued (e.g., past, present and/or future messages or commands) by devices in system 100 based on information (e.g., for network enabled and/or non-network enabled devices) other than information collected by communication monitor 210. For example, message identifier 230 or another component may acquire device information such as controlled device(s), protocol and/or command set information from a device and/or a user using a device (e.g., all at once or by ad hoc or structured inquiry/response learning procedure) and/or by downloading information from the Internet such as from a manufacturer web page based on identified devices in system 100).

In an example, each network control message exchanged between devices coupled to LAN interface 115 may be identified (e.g., in part using device identifications). Message identification may be extended to identifying or recognizing one or more commands by sending devices to be carried out by one or more receiving devices based on one or more identified control messages (e.g., turn device on/off, play, pause, stop, FF, rewind media content, etc.). Message identification and/or command recognition may be performed using various techniques. In an example, messages and/or commands may be recognized, for example, when a communication protocol used to transmit a control message may be known. For example, an open source communication protocol, such as Android Debug Bridge (ADB), may be known. In another example, machine learning techniques may be used to recognize messages and/or commands. For example, an IP-based "Play" message may be sent from a controller device to a controlled device. The controlled device may (e.g., upon responding to the command message) send an HDMI-CEC Active Source message. Message identifier 230 (or another component) may observe and link the IP message and HDMI-CEC message. Message identifier 230 and/or other component(s) may infer a sending device, receiving device(s) and command(s) to be carried out (e.g., based on one or more messages that may or may not be linked). As addressed with learning component 270, messages and/or commands may be learned (e.g., by explicitly requesting a user to perform certain operations and mapping the operations to the messages). Message identifier 230 may leverage learned messages and/or commands with respect to identifying current or real-time messages and/or commands. Message identifier 230 may support learning, for example, by collecting or storing known messages or commands to accumulate knowledge for future reference (e.g., in reference information 280).

Message interpreter 240 may interpret (e.g., in real-time) a message or command to determine what (if anything) to do with respect to devices in system 100 that may be unaffiliated or incompatible with an identified message or command. In an example, message interpreter may be integrated with device control 250 and/or message control 260. Message interpreter 240 may operate one or more algorithms, for example, that may attempt to determine device or user intent or determine what may be in the interests of system integration of incompatibly controlled devices in system 100. Message interpreter 240 may, for example, use reference information 280 to make one or more determinations. For example, the message/command, the sending and receiving devices of the message/command, the configuration of devices in system 100, a state of one or more (e.g., all) devices in system 100 at the time of the identified message/command, and/or an event log indicating previous states and/or messages/commands may be used by one or more algorithms to determine whether to control (e.g., issue a command to change a state of) one or more devices in system 100 that the identified message/command does not control.

Device control 250 may carry out (e.g., execute) determinations by message interpreter 240 to control (e.g., issue a command to change a state of) device 105. For example, device control 250 may provide control to one or more switches in device 105, such as switches control active HDMI In ports and active HDMI Out ports.

Message control 260 may carry out determinations by message interpreter 240 to control (e.g., issue a command to change a state of) one or more devices in system 100 (e.g., other than device 105). Message control 260 may control construction of messages to be transmitted via each interface of device 105. Message control 260 and/or device control 250 may control transmitters and receivers for each interface of device 105. For example, message control 260 may construct and send an IP, HDMI-CEC, IR, BT or other communication to one or more devices in system 100.

Learning control 270 may learn statically (e.g., outside operation of devices in system 100) and/or dynamically (e.g., during real-time operation of devices in system 100). Information monitored by communication monitor 210, devices identified by device identifier 220, messages identified by message identifier 230, determinations made by message interpreter 240, feedback provided by a user (e.g., using a device), information learned by learning control 270, and reference information 280 may form a knowledge base for learning. Learning control 270 may have one or more modes of operation to learn, which may be selectable by a user (e.g., using a controller associated with device 105). Learning control 270 may acquire system configuration information, device information, controlled device information, interface information, communication protocol information, command information, etc. from one or more sources of information (e.g., from devices, from user input, from Internet downloaded information and so on). Learning control 270 may passively collect information or may actively probe devices and/or users for information, such as device identification, device address, device capabilities, power state, operational state, message protocol, commands, interface type(s), etc. Learning control 270 may request user input, for example, to determine information about system 100 and/or devices in system 100 and/or to learn user instructions (e.g., to override default operation). For example, learning control 270 may ask a user (e.g., as a system integration question) to indicate whether one or more commands (e.g., individually or as a set) from one or more remotes should always or never be interpreted for use to control one or more incompatible devices in system 100.

Reference information 280 may obtain, store, search and access or retrieve information, such as information monitored by communication monitor 210, devices identified by device identifier 220, messages identified by message identifier 230, determinations made by message interpreter 240, feedback about determinations provided by a user (e.g., using a device), information learned by learning control 270, and reference information otherwise obtained, such as source and sink device manufacturers, devices, protocols, messages, etc., which may be obtained, for example, from devices, manufacturer websites on the Internet, etc. Reference information may be stored in any form of memory.

Processor 110 may, effectively, determine whether control signals from controllers may (e.g., should) be used to control devices that the controllers and their control signals are not configured to control (e.g., in the interest of improving user experience with system 100 that may consist of a "hodgepodge" of incompatible devices from different manufacturers with a slew of different controllers). Processor 110 may, effectively, expand the utility of incompatible controllers (without reprogramming), integrate or harmonize an environment of incompatible devices and controllers and relieve end-users from the burdens of always finding the right controller for the right device or buying, programming and learning to use expensive programmable controllers to replace multiple controllers.

In an example, a state of devices in system 100 may be, at least in part, that HDMI In 2 port of device 105 is active for HDMI Source 2 (e.g., a set top box). An IP message from IP Controller 1 (e.g., game controller) with a "Play" command intended for HDMI Source 3 device (e.g., a video game console) may be transmitted. The message may be received by LAN interface 115. The IP message and command therein may be identified by message identifier 230. The message and command therein may be incompatible with (e.g., unable to control) HDMI Source 2 and device 105, perhaps among other devices. Message interpreter 240 may determine what (if anything) to do.

Continuing with the example, message interpreter 240 may access reference information 280, which may include learned information from learning control 270, to determine existing conditions (e.g., configuration, device states, event log, historical commands and actions taken with user confirmation or acquiescence). In an example, depending on reference information 280, message interpreter 240 may interpret the identified play command as being intended for HDMI Source 3 (using the wrong controller), intended for HDMI Source 2 (using its designated controller), an accidental message/command, etc. Each of several alternatives may be weighted by probability based on available information. For example, device state and/or event log information may indicate that HDMI Source 3 may or may not be ON, that there may or may not be media content prepared to play in HDMI Source 3, that HDMI Source 2 may be playing or may be paused or stopped. In an example, message interpreter 240 may determine the most probable user intent (based on reference information 280) meets or exceeds a threshold to control device 105 and/or other devices in system 100 and may indicate to device control 250 to control one or more switches to deactivate HDMI In 2 port and activate HDMI In 3 port (e.g., for video game console at HDMI Source 3). In an example, message interpreter 240 may determine the most probable user intent (e.g., based on reference information 280) meets or exceeds a threshold that HDMI Source 2 should receive a command (e.g., from message control 260) to change state from pause or stop to play media based on the identified incompatible control signal/command. In an example, message interpreter 240 may determine that no action should be taken, for example, when the command is deemed accidental or when the probabilities associated with user intent determined by one or more algorithms fail to exceed a threshold. In an example, message interpreter may determine that device 105 may ask the user for explicit instruction (e.g., via popup question), for example, when probabilities of user intent fail to meet a threshold.

In another example, a streaming HDMI source device may be streaming content through an active HDMI In port through an HDMI Out port to an HDMI sink device (e.g., TV). A user may press the Pause button on the sink device's associated remote control, which may transmit a message with a pause command via IP, IR, BT or other technology that may be received by an interface on device 105. The sink device pause command may have no effect on the streaming media source device (e.g., due to incompatible technology or communication protocol). Message interpreter 240 may determine that the most probable user intent was to pause the active HDMI source device (e.g., streaming media player) streaming content to the active sink device (e.g., TV) and may instruct message control 260 to issue a command via a respective interface to the active HDMI source device. Message interpreter 240 and/or message control 260 may translate, map and/or format the received control message or create a new message with a pause command and cause transmission of the message with a command that causes the streaming media device to pause streaming content.

In another example, a user may operate a non-IP based controller to control device 105. For example, a user may press volume up on a remote associated with device 105, which may transmit (by relevant technology mentioned elsewhere herein or otherwise known) a message with a "Volume Up" command to device 105. An interface in device 105 may receive the message, which may be identified by message identifier 230. Message interpreter 240 may translate or format the identified message into a message with a volume up command for an HDMI source device coupled to the currently active HDMI In port of device 105.

Intelligent system or device integration (e.g., by an HDMI smart switch) may be implemented, for example at least in part, in the form of operations, procedures or methods.

Figure 3:
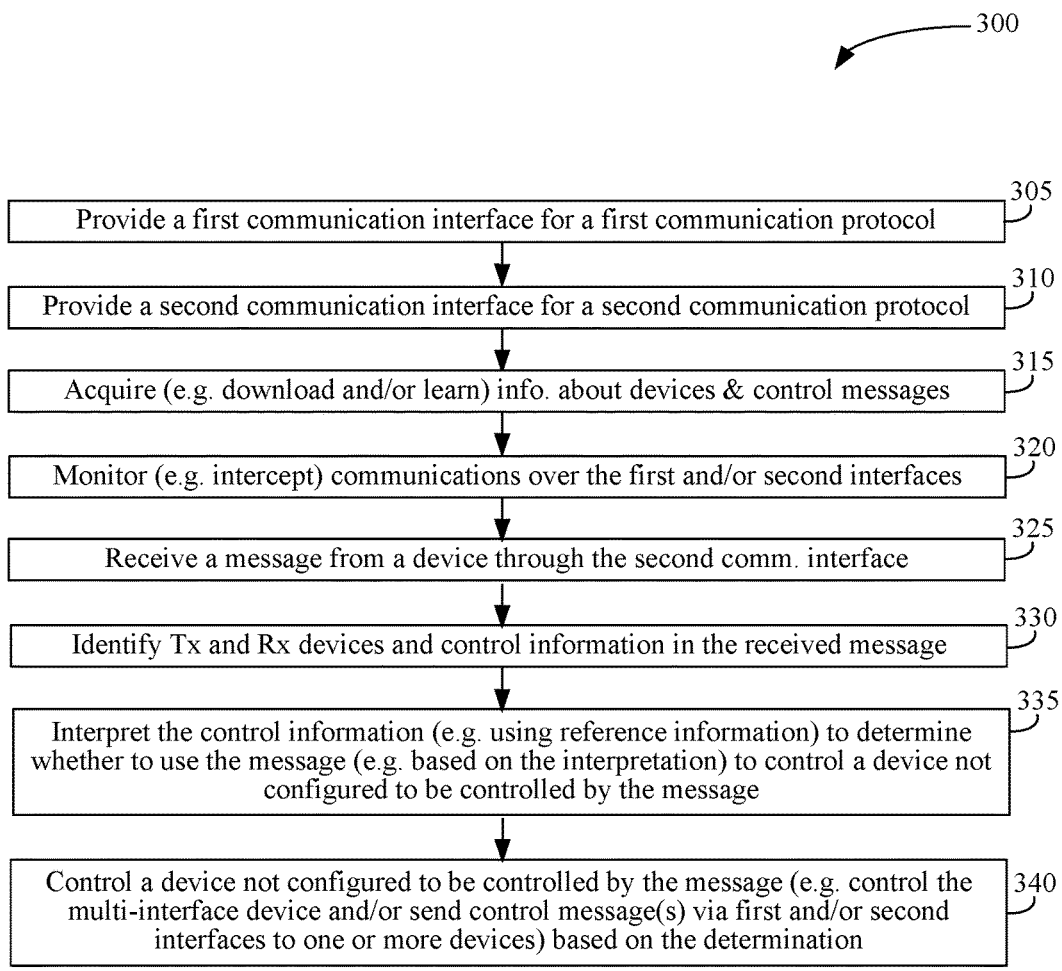
FIG. 3 shows a flowchart of a procedure to provide system integration by interpreting control signals to control devices that the control signals do not control, according to an example embodiment.

For instance, FIG. 3 shows a flowchart 300 of a procedure to provide system integration by interpreting control signals to control devices that the control signals do not control, according to an example embodiment. No order of steps is required in flowchart 300 unless expressly indicated or inherently required. Operations may be performed out of order, in an alternate sequence, or partially (or completely) concurrently with each other or with other operations. There is no requirement that an implementation implement all steps shown in FIG. 3. Other examples may not implement one or more operations described in flowchart 300. Embodiments may implement fewer, more or different steps. Other structural and operational embodiments will be apparent to persons skilled in the relevant art(s) based on discussion herein. Flowchart 300 is described as follows.

In example step 305, a first communication interface may be provided for a first communication protocol. For example, as shown and discussed with respect to FIGS. 1 and 2, device 105 may provide an HDMI interface with HDMI input ports HDMI In 1-N and HDMI output ports HDMI Out 1-N. HDMI may provide a first communication protocol such as HDMI-CEC.

In example step 310, a second communication interface may be provided for a second communication protocol. For instance, as shown and discussed with respect to FIGS. 1 and 2, device 105 may provide LAN interface 115 for a second (e.g., IP) communication protocol.

In example step 315, information about devices and control messages may be acquired (e.g., downloaded and/or learned). For instance, as shown and discussed with respect to FIGS. 1 and 2, processor 110 may acquire information about devices in system 100 and control messages provided by or to the devices. In an example, communication monitor 210, device identifier 220, message identifier 230, learning control 270 and/or reference information 280 may acquire information about devices in system 100 and control messages provided by or to IP Controller 1-N, IR Controller 1-N, BT Controller 1-N, HDMI Source 1-N and/or HDMI Sink 1-N.

In example step 320, communications over the first and/or second interfaces may be monitored (e.g., snooped or intercepted). For instance, as shown and discussed with respect to FIGS. 1 and 2, communication monitor 210 may monitor communications over one or more of HDMI interface ports HDMI IN 1-N and HDMI OUT 1-N, LAN Interface 115, IR Interface 130, BT Interface 135 and WAN interface 120.

In example step 325, a message may be received from a device through the second communication interface. For example, as shown and discussed with respect to FIGS. 1 and 2, device 105 LAN interface 115 may receive an IP communication from IP Controller 1 via wired or wireless connection 107.

In example step 330, transmitting and receiving devices and a control message may be identified in the received message. For example, as shown and discussed with respect to FIGS. 1 and 2, processor 110, component device identifier 220, and message identifier 230 may identify transmitting device IP Controller 1, receiving device (e.g., HDMI Source 2) and command or control message (e.g., play, pause, stop, FF, rewind, turn ON, turn OFF) in the IP message received from IP Controller 1.

In example step 335, the control information (e.g., command) may be interpreted (e.g., using reference information) to determine whether to use the message (e.g., based on the interpretation) to control a device not configured to be controlled by the message. For example, as shown and discussed with respect to FIGS. 1 and 2, processor 110 component message interpreter 240 may interpret the control message (e.g., play, pause, stop, FF, rewind, turn ON, turn OFF) in the IP message received from IP Controller 1. Message interpreter 240 may interpret the command using reference information 280 (e.g., system device states, event log, system configuration) to determine what action (if any) device 105 should take with respect to one or more devices (e.g., including device 105) that are not controlled by the received IP message.

In example step 335, a device not configured to be controlled by the message may be controlled based on the determination (e.g., a multi-interface device may be controlled and/or one or more control messages may be sent via first and/or second interfaces to one or more devices). For example, as shown and discussed with respect to FIGS. 1 and 2, processor 110 components device control 250 and message control 260 may (e.g., based on a determination by message interpreter 240) control device 105 (e.g., by changing an active HDMI input port HDMI In 1-N and/or active HDMI output port HDMI Out 1-N) and/or send a control message (e.g., to turn on, turn off, play, stop) to one or more of HDMI Source 1-N and HDMI Sink 1-N, where these devices and device 105 are not controlled by the interpreted message.

The procedure of flowchart 300 may, effectively, determine whether control signals from controllers may (e.g., should) be used to control devices that the controllers and their control signals are not configured to control (e.g., in the interest of improving user experience with system 100 that may consist of a "hodge-podge" of incompatible devices from different manufacturers with a slew of different controllers). The procedure of flowchart 300 may, effectively, expand the utility of incompatible controllers (without reprogramming), integrate or harmonize an environment of incompatible devices and controllers and relieve end-users from the burdens of always finding the right controller for the right device or buying, programming and learning to use expensive programmable controllers to replace multiple controllers.

III. Example Computer System Implementation

The embodiments described above with respect to FIGS. 1-3 may be implemented in hardware or hardware combined with one or both of software and/or firmware (e.g., in a general or special purpose computing device). For example, various functions (e.g., logic, algorithms, databases, operations) described in examples (e.g., FIGS. 1-3) may be implemented as computer program code, which may be stored on a storage device and/or executed by one or more processors. In another example, various functions may be implemented as hardware (e.g., hardware logic/electrical circuitry) alone or combined with software (computer program code configured to be executed in one or more processors or processing devices) and/or firmware.

Figure 4:
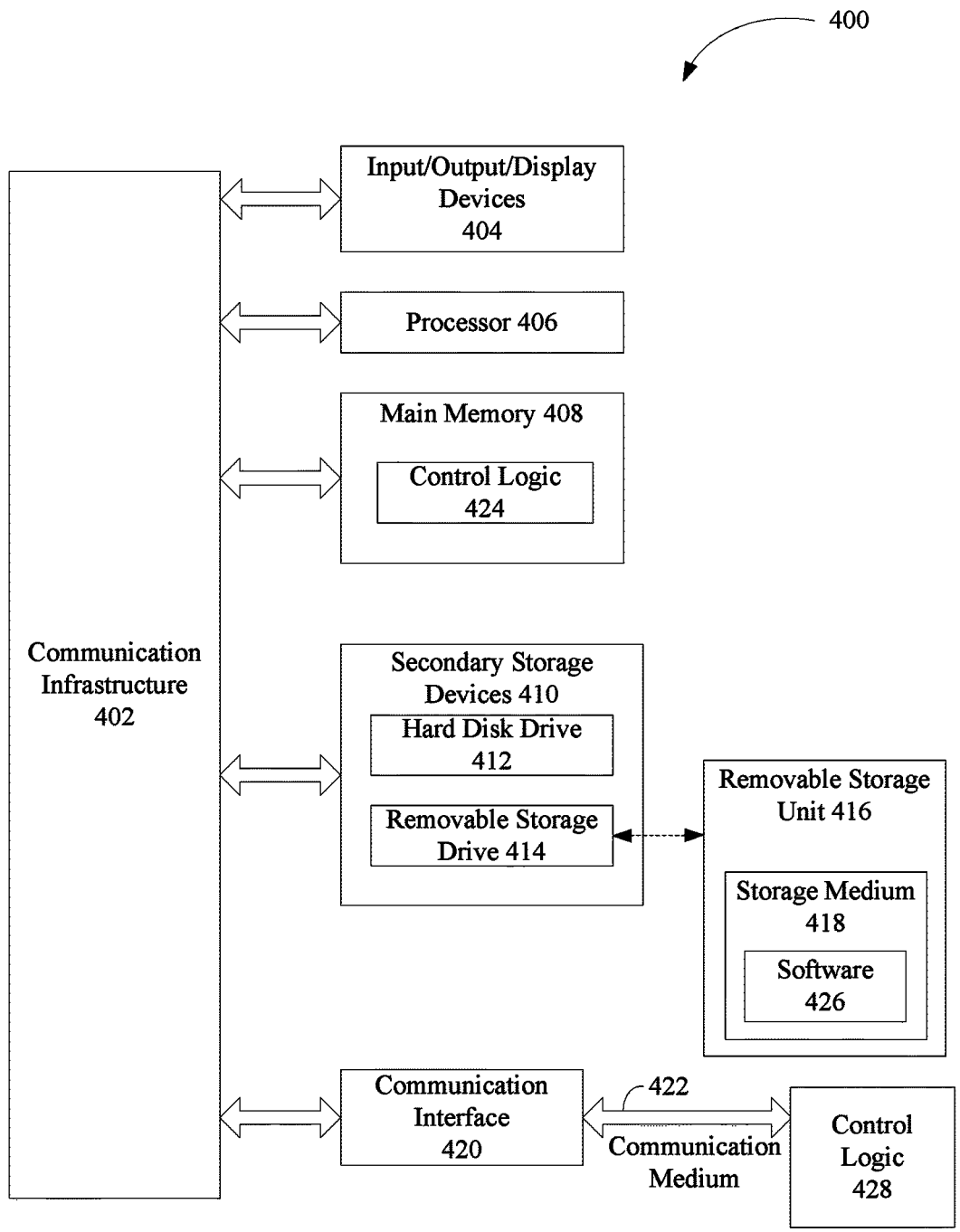
FIG. 4 is an example computer system in which examples herein and/or other examples may be implemented.

FIG. 4 is an example computer system in which examples herein and/or other examples may be implemented. Examples, including systems, methods/processes, and/or apparatuses, may be implemented using a (e.g., well known) computer, such as computer 400 shown in FIG. 4. For example, various functions (e.g., logic, algorithms, databases, operations) described in examples (e.g., FIGS. 1-3) be implemented using one or more computers 400.

Computer 400 may be, for example, any commercially available and well known computer capable of performing the functions described herein, such as computers available from International Business Machines, Apple, Sun, HP, Dell, Cray, etc. Computer 800 may be any type of computer, including a desktop computer, a server, etc.

As shown in FIG. 4, computer 400 includes one or more processors (also called central processing units, or CPUs) such as a processor 406. Processor 406 may be used to implement all or a portion of one or more functions described with respect to examples shown in FIGS. 1-3, although the scope of the embodiments is not limited in this respect. Processor 406 is connected to a communication infrastructure 420, such as a communication bus. In an example, processor 406 may simultaneously operate multiple computing threads.

Computer 400 may include a primary or main memory 408, such as random access memory (RAM). Main memory 408 may store control logic 424 (computer software) and data.

Computer 400 may include one or more secondary storage devices 410. Secondary storage devices 410 may include, for example, a hard disk drive 412, a removable storage device or drive 414 and/or other types of storage devices, such as memory cards and memory sticks. For example, computer 400 may include an industry standard interface, such a universal serial bus (USB) interface for interfacing with devices such as a memory stick or an HDMI interface for interfacing with HDMI devices. Removable storage drive 414 may represent, for example, a floppy disk drive, a magnetic tape drive, a compact disk drive, an optical storage device, tape backup, etc.

Removable storage drive 414 may interact with a removable storage unit 416. Removable storage unit 416 may include a computer useable or readable storage medium 418, which may store computer software 426 (control logic) and/or data. Removable storage unit 416 may represent, for example, a floppy disk, magnetic tape, compact disc (CD), digital versatile disc (DVD), Blu-ray™ disc, optical storage disk, memory stick, memory card or any other computer data storage device. Removable storage drive 414 may read from and/or write to removable storage unit 416.

Computer 400 may include input/output/display devices 404, such as monitors, keyboards, pointing devices, etc.

Computer 400 may include a communication or network interface 420. Communication interface 420 may enable a computer 400 to communicate with remote devices. For example, communication interface 420 may allow computer 400 to communicate over communication networks or mediums 422 (representing a form of a computer useable or readable medium), such as local area networks (LANs), wide area networks (WANs), the Internet, etc. Communication interface 420 may interface with remote sites or networks via wired or wireless connections. Examples of communication interface 422 may include, for example, a modem, a network interface card (e.g., an Ethernet card), a communication port, a Personal Computer Memory Card International Association (PCMCIA) card, etc.

Control logic 428 may be transmitted to and from computer 400 via the communication medium 422.

Any apparatus or manufacture comprising a computer useable or readable medium having control logic (software) stored therein is referred to herein as a computer program product or program storage device. This includes, but is not limited to, computer 400, main memory 408, secondary storage devices 410, and removable storage unit 416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for implementing one or more functions described in examples herein (e.g., in FIGS. 1-3) and/or further embodiments described herein. Embodiments of the invention are directed to computer program products comprising such logic (e.g., in the form of program code, instructions, or software) stored on any computer useable medium. Such program code, when executed in one or more processors, causes a device to operate according to one or more examples described herein or other examples of subject matter disclosed herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 4 shows a server/computer, persons skilled in the relevant art(s) would understand that embodiments/features described herein could also be implemented using any other (e.g., well-known) processor-based computing devices, including but not limited to, smart phones, tablet computers, netbooks, gaming consoles, personal media players, and the like.

IV. Conclusion

In accordance with an embodiment, any combination of the above-described embodiments may be utilized, e.g., depending on the system being implemented.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

Embodiments are not limited to the functional blocks, detailed examples, steps, order or the entirety of subject matter presented in the examples. An embodiment of a device, apparatus or machine may comprise any one or more features described herein in any configuration. An embodiment of a method or process may comprise any process described herein, in any order, with any number of steps, using any modality.

Proper interpretation of subject matter claimed in this patent application is limited to patentable subject matter under 35 U.S.C. § 101. As claimed, a procedure (e.g., method) is a process defined by 35 U.S.C. § 101 and each of a circuit, device, apparatus, machine, system, computer, module, media and the like is a machine and/or manufacture defined by 35 U.S.C. § 101.

The appended claims encompass examples and features described herein, modifications and variations thereto as well as additional examples and features that fall within the spirit and scope of the disclosed subject matter.

What is claimed is:

1. A multimedia switching device comprising:
   a wide area network interface configured to couple the multimedia switching device to a wide area network;
   a local area network interface, the multimedia switching device configured to couple devices coupled to the local area network interface to the wide area network; and
   a processor configured to:
      receive a protocol message from a first control device coupled to the local area network interface, the first control device and the protocol message being configured to control a first multimedia device of a plurality of multimedia devices that are coupled to the local area network interface, the first control device and the protocol message not being configured to control a second multimedia device of the plurality of multimedia devices;
      determine that the second multimedia device is being utilized;
      generate one or more control messages for the second multimedia device based on the protocol message received from the first control device; and
      transmit the one or more control messages to the second multimedia device.

2. The multimedia switching device of claim 1, further comprising:
   a communication interface,
   wherein the processor is configured to determine one or more second controls for the first multimedia device based on a second protocol message received via the communication interface and that is not configured to control the first multimedia device.

3. The multimedia switching device of claim 2, wherein the communication interface comprises a High Definition Multimedia Interface (HDMI), the second protocol message is in accordance with a HDMI Consumer Electronics Control (CEC) protocol.

4. The multimedia switching device of claim 1, wherein the multimedia switching device is configured to couple a plurality of HDMI devices and a plurality of non-HDMI devices to the local area network interface.

5. The multimedia switching device of claim 4, wherein the plurality of HDMI devices coupled to the local area network interface comprises at least one HDMI source device and at least one HDMI sink device.

6. The multimedia switching device of claim 5, wherein the processor is configured to obtain device and control information by monitoring internet protocol messages between the local area network interface and the wide area network interface.

7. The multimedia switching device of claim 1, wherein the multimedia switching device comprises an HDMI switch.

8. The multimedia switching device of claim 7, wherein the one or more controls further comprise a control signal for selection of an active source input of the HDMI switch.

9. The multimedia switching device of claim 7, wherein the one or more controls comprises composing and sending at least one of an internet protocol control message or an HDMI control message to the first multimedia device.

10. The multimedia switching device of claim 7, wherein at least one of the HDMI switch or the first multimedia device coupled to the HDMI switch is controlled based on an interpretation of a network communication.

11. The multimedia switching device of claim 1, wherein the processor is configured to learn control signals by at least one of (i) acquiring a message protocol of the first control device (ii) observing and linking sequences of control operations, or (iii) requesting actions and observing responses.

12. The multimedia switching device of claim 1, wherein the multimedia switching device enables the first control device to operate the plurality of multimedia devices, coupled to the local area network interface, that the first control device is incompatible with by interpreting a control message received from the first control device and translating or mapping the control message to at least one operation compatible with the plurality of multimedia devices.

13. A method performed by a multimedia switching device comprising a wide area network interface configured to couple the multimedia switching device to a wide area network, comprising:
   receiving a protocol message from a first control device coupled to a local area network interface of the multimedia switching device, the first control device and the protocol message configured to control a first multimedia device of a plurality of multimedia devices coupled to the local area network interface, the first control device and the protocol message not being configured to control a second multimedia device of the plurality of multimedia devices, the multimedia switching device configured to couple devices coupled to the local area network interface to the wide area network;
   determining that the second multimedia device is being utilized;
   generating one or more control messages for the second multimedia device based on the protocol message received from the first control device; and
   transmitting the one or more control messages to the second multimedia device.

14. The method of claim 13, further comprising:
   monitoring communications over the local area network interface for information;
   using the monitored information to identify devices coupled to the local area network interface and control messages received via the local area network interface and to accumulate reference information;
   interpreting the protocol message based on the reference information; and
   using the interpretation to determine the one or more control messages.

15. The method of claim 13, wherein the multimedia switching device further comprises a High Definition Multimedia Interface (HDMI).

16. The method of claim 15, wherein the multimedia switching device comprises an HDMI switch.

17. A non-transitory computer-readable storage medium having program instructions recorded thereon that, when executed by processor of a multimedia switching device comprising a wide area network interface configured to couple the multimedia switching device to a wide area network, perform a method, the method comprising:

receiving a protocol message from a first control device coupled to a local area network interface included in the multimedia switching device, the protocol message configured to control a first multimedia device of a plurality of multimedia devices coupled to the local area network interface, the first control device and the protocol message not being configured to control a second multimedia device of the plurality of multimedia devices, the multimedia switching device configured to couple devices coupled to the local area network interface to the wide area network;

determining that the second multimedia device is being utilized;

generating one or more control messages for the second multimedia device based on the protocol message received from the first control device; and transmitting the one or more control messages to the second multimedia device.

18. The non-transitory computer-readable storage medium of claim 17, further comprising:

monitoring communications over the local area network interface for information;

using the monitored information to identify devices coupled to the local area network interface and control messages received via the local area network interface and to accumulate reference information;

interpreting the protocol message based on the reference information; and using the interpretation to determine the one or more control messages.

19. The non-transitory computer-readable storage medium of claim 17, wherein the multimedia switching device further comprises a High Definition Multimedia Interface (HDMI).

20. The non-transitory computer-readable storage medium of claim 19, wherein the multimedia switching device comprises an HDMI switch.

* * * * *